(No Model.)
C. COLLS.
PNEUMATIC TIRE.
No. 603,374. Patented May 3, 1898.
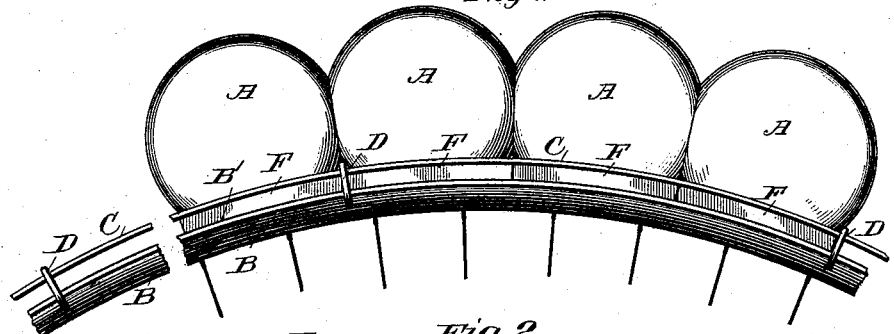
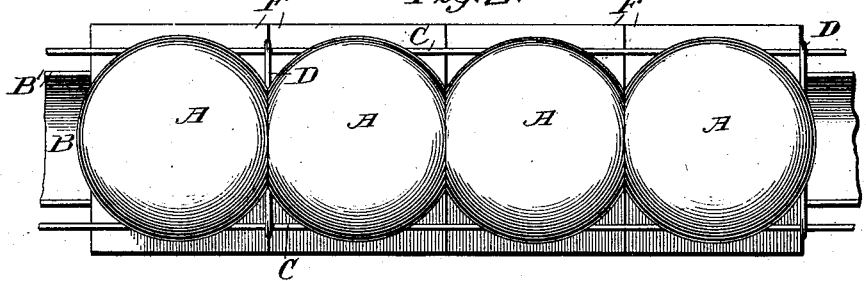
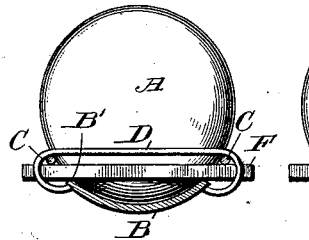 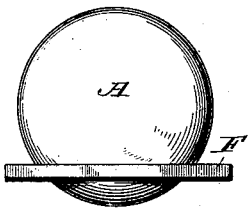 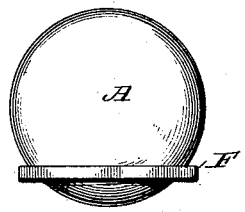
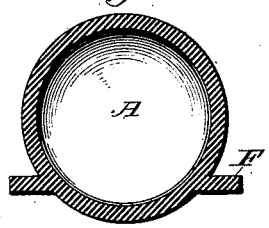 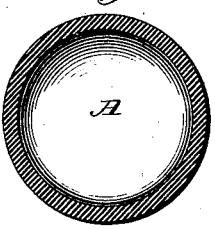
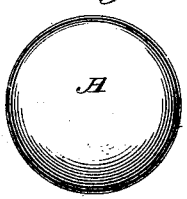
Witnesses
Jos. C. Stack
James M. Spear
Inventor
Clara Colls
By Richards & Co
Attys.

UNITED STATES PATENT OFFICE.

CLARA COLLS, OF BEACONWOOD BURNT GREEN, ENGLAND.

PNEUMATIC TIRE.

SPECIFICATION forming part of Letters Patent No. 603,374, dated May 3, 1898.

Application filed December 16, 1896. Serial No. 615,929. (No model.)

*To all whom it may concern:*

Be it known that I, CLARA COLLS, a subject of the Queen of Great Britain and Ireland, and a resident of Beaconwood Burnt Green, in the county of Worcester, England, have invented certain new and useful improvements in and relating to the construction of pneumatic or elastic ball-tires and in the manufacture of the rims of wheels for bicycles, tricycles, and other velocipedes and vehicles and in the mode of attaching the tires to the rims, of which the following is a specification.

The objects of my invention are, first, to so construct the tires as to prevent or minimize liability of the same being punctured, or in the event of a puncture to a simple method of repairing the tires, and also to an arrangement for attaching the said tires or sections composing the same to the rims of the wheels; secondly, to the particular construction of the said rims, which are of a skeleton form, for this purpose, and whereby the weight is reduced to a minimum while retaining the maximum strength.

Referring to the drawings which form a part of this specification, Figure 1 represents a part side elevation of a rim and ball-tire for cycles and the like. Fig. 2 represents a plan view of Fig. 1. Fig. 3 represents a part sectional elevation. Fig. 4 represents an elevation of a single ball, showing a side view of a square-shaped flat flange thereon, more particularly referred to hereinafter. Fig. 5 represents an elevation of a ball, showing the said flat flange as seen from a side view, such as Fig. 1. Fig. 6 represents a transverse part sectional view of my improved wheel-rim, showing one of the divisional wires or cross-pieces in elevation. Fig. 7 represents in section a single ball with its flat solid rubber flange. Figs. 8 and 9 represent in elevation and section a plain rubber ball having no flange.

The formation and construction of the tread or tire consists in the use of a series of hollow rubber or other balls A or blocks or sections of other shapes, but preferably balls, forming air-chambers by their natural inflation, arranged consecutively around the rim B of the wheel and touching or nearly touching one another in order to provide combined support for the column of the tire. Said balls A obtain their seating in the concave or other formation of the circumferential rim B and are securely retained in a rigid position by the aid of circumferential wires C or of other suitable metal. Said wires or rails C are attached upon each side of the rim B by metallic sections or strengthening-wires D or other material, which may be formed integral with the rim or soldered, riveted, or otherwise attached to said rim, if required, and form divisions crosswise at a given distance apart—for instance, at every third ball or more or less, as desired—the whole forming a skeleton rim.

It will be seen on referring to Figs. 1 and 2 that the mode of attaching the balls A consists in passing the square flat solid rubber flanges F, which are made integral with the rubber ball, between the edges B' of the rim B beneath the circumferential wires C, which press upon and obtain a firm bearing upon the projecting flat flanges, as at F. It will also be observed that these flanges do not project in cross-section, so that the circular sides of the balls may (or may not) be somewhat compressed each to each, so as to lend additional support to one another, thus forming a solid column of strength to the tire.

By reason of the aforesaid solid flanges F being preferably situated upon the balls nearer to the crown of same than to the road-surface about three-fourths of the circumference of the balls are available for the exposed part forming the tread of the tire, thus giving great resiliency, while the remaining one-fourth forms the bearing-surface within the concave rim, within which it conveniently adapts itself, assisted by the rubber flat flanges, or said flat flanges may be formed upon the balls nearer to or at the centers of same.

When balls are used without the aforesaid solid rubber flanges thereon, as in Figs. 8 and 9, the circumferential wires or rails C will be so constructed and connected with the rim B that they will impinge the balls considerably past the centers of their circumference, whereby they are retained in position when pressed close together to form the tread or tire, and are thus prevented from falling out. In either case each ball as soon as placed in the rim is perfectly firm and independent of its neighbor, except for the purpose of combined support, though the advantage gained by having the solid rubber flanges thereon in manner above described is that by reason of their square formation it is obviously impossible for any individual ball or section to work around or become displaced from the rim in wear. While each ball is securely attached, as shown, any one of them can be readily detached for the purpose of repairing, renewing, or otherwise, and while the essential features of pneumatic or elastic tires are fully maintained many advantages are gained, as the tires can be so easily renewed and the injured section immediately repaired at a minimum amount of trouble and cost.

The balls or sections may, if desired, be covered with a casing or casings of leather or other suitable material attached in any suitable manner, either around the balls or sections or to the skeleton rim by being laced or otherwise fastened thereto. A convenient means of attachment may consist of a casing or cover of leather, rubber, canvas, or other suitable material provided with eyelet-holes at the edges thereof, into and through which may be passed suitable clips, hooks, wires, or other attachments, which are secured around the circumferential side wires or rails upon the rim and so secures the cover or casing firmly over the ball-treads.

I may add that the skeleton rims may be suitably adapted for continuous pneumatic or elastic tires. Furthermore, the aforesaid circumferential wires or rails forming auxiliary rims to the main rims of the wheels may be formed integral with said main rims, so as to dispense with the aforesaid divisional wires or cross-pieces.

I am aware that balls or sections have been in use for cycle-tires in various forms, and therefore I do not broadly make any claim to the employment of balls or sections generally; but,

Having now described my invention, what I claim as new, and desire to secure by Letters Patent, is—

In combination, the rim, the wires C extending about the edges thereof with a space between said edges and wires, the balls having the flanges projecting laterally in relation to the rim and through the circumferential space between the rim edge and the wire, and the cross-wires D extending between the balls over the rails or wires C and having their ends bent down and under the edges of the rims, substantially as described.

In witness whereof I have hereunto set my hand in presence of two witnesses.

CLARA COLLS.

Witnesses:
EDWD. BURTON PAYNE,
ALBERT NEWEY.